(12) United States Patent
Wang et al.

(10) Patent No.: US 11,529,756 B2
(45) Date of Patent: Dec. 20, 2022

(54) LCP FILM PRODUCTION APPARATUS AND METHOD

(71) Applicant: NANJING BREADY ELECTRONICS CO., LTD., Nanjing (CN)

(72) Inventors: Fen Wang, Nanjing (CN); Yong Liu, Nanjing (CN)

(73) Assignee: NANJING BREADY ELECTRONICS CO., LTD., Nanjing (CN)

( * ) Notice: Subject to any disclaimer, the term of this patent is extended or adjusted under 35 U.S.C. 154(b) by 37 days.

(21) Appl. No.: 16/965,861

(22) PCT Filed: Jun. 10, 2020

(86) PCT No.: PCT/CN2020/095427
§ 371 (c)(1),
(2) Date: Jul. 29, 2020

(87) PCT Pub. No.: WO2020/177786
PCT Pub. Date: Sep. 10, 2020

(65) Prior Publication Data
US 2021/0213664 A1    Jul. 15, 2021

(30) Foreign Application Priority Data

May 7, 2020    (CN) .......................... 202010375716.5

(51) Int. Cl.
*B29C 48/28* (2019.01)
*B29C 48/285* (2019.01)
(Continued)

(52) U.S. Cl.
CPC ........ *B29C 48/288* (2019.02); *B29C 48/0011* (2019.02); *B29C 48/022* (2019.02);
(Continued)

(58) Field of Classification Search
CPC ..... B29C 48/288; B29C 48/022; B29C 48/08; B29C 48/397; B29C 48/832;
(Continued)

(56) References Cited

U.S. PATENT DOCUMENTS 7,862,765 B2 *  1/2011  Hwang ............... B29C 45/0013
                                                          264/435
10,322,537 B2 *  6/2019  Tan ..................... B29C 45/2806

FOREIGN PATENT DOCUMENTS

CN    101613502    * 12/2009    ............. C08L 23/00
CN    203713022    *  7/2014    ............. B29C 47/00
(Continued)

*Primary Examiner* — Matthew J Daniels
*Assistant Examiner* — Shibin Liang
(74) *Attorney, Agent, or Firm* — Hauptman Ham, LLP

(57) ABSTRACT

The present invention discloses an LCP film production apparatus and method. The apparatus includes: a rack; a screw extrusion device; a T-shaped material port; a squeezing assembly, where the squeezing assembly includes a first roller wheel, a second roller wheel, and a third roller wheel, the first roller wheel and the second roller wheel are fixedly mounted directly below the T-shaped material port side by side, and the third roller wheel is fixedly mounted next to the second roller wheel side by side; and an electromagnetic field generator, fixedly connected to the T-shaped material port and mounted around the T-shaped material port in a circle by means of bolts, where the screw extrusion device is fixedly mounted at the top of the rack, and the T-shaped material port is fixedly mounted on one end of the screw extrusion device. According to the present invention, a field generated by the electromagnetic field generator can disrupt the ordered arrangement of LCP molecules, thereby alleviating or even eliminating the anisotropic problem of transverse and longitudinal tensile strength thereof.

8 Claims, 6 Drawing Sheets

(51) Int. Cl.
*B29C 48/00* (2019.01)
*B29C 48/08* (2019.01)
*B29C 48/395* (2019.01)
*B29C 48/80* (2019.01)
B29K 67/00 (2006.01)
B29K 105/00 (2006.01)

(52) U.S. Cl.
CPC ............ *B29C 48/08* (2019.02); *B29C 48/397* (2019.02); *B29C 48/832* (2019.02); *B29K 2067/00* (2013.01); *B29K 2105/0079* (2013.01)

(58) Field of Classification Search
CPC . B29C 48/0011; B29C 55/02; B29K 2067/00; B29K 2105/0079; B29K 101/12; G02B 5/30
See application file for complete search history.

(56) References Cited

FOREIGN PATENT DOCUMENTS

| | | | | |
|---|---|---|---|---|
| CN | 207711319 | * | 8/2018 | ............. B29C 47/00 |
| CN | 210759036 | * | 6/2020 | ............. B29C 45/46 |
| JP | 2005134768 | * | 5/2005 | ............... G02B 5/30 |

* cited by examiner

LCP FILM PRODUCTION APPARATUS AND METHOD

RELATED APPLICATIONS

The present application is a National Phase of International Application Number PCT/CN2020/095427, filed Jun. 10, 2020, and claims the priority of China Application No. 202010375716.5, filed May 7, 2020.

TECHNICAL FIELD

The present invention relates to the technical field of LCP film production, and in particular, to an LCP film production apparatus and method.

BACKGROUND

LCP (i.e., Liquid Crystal Polymer) is a wholly aromatic liquid crystal polyester type polymer material consisting of a rigid polymer chain structure, and is novel high-performance special engineering plastic. The LCP has the characteristics of low moisture absorption, good chemical resistance, and high gas barrier properties, and it is a dielectric material with a low dielectric constant and a low dielectric loss factor, making the 5G technology have higher frequency and higher speed. In the future, the LCP will be widely used in antennas for mobile phones, soft boards for cameras, high-speed transmission lines for notebook computers, and antennas for smart watches.

However, at present, in the preparation process of LCP, it is easy to form anisotropy of transverse and longitudinal tensile strength due to its molecular rod-like characteristics, resulting in product defects, that is, it is easy to form stripes along an MD direction (machine direction, roller direction); it is easy to stretch and break along a TD direction (film width direction); it is not easy to stretch and break along the MD direction; or it is easy to tear along the MD direction.

SUMMARY

The present invention aims to provide an LCP film production apparatus and method. A field generated by an electromagnetic field generator can disrupt the ordered arrangement of LCP molecules, thereby alleviating or even eliminating the anisotropic problem of transverse and longitudinal tensile strength thereof.

The present invention provides the following technical solution: an LCP film production apparatus, including: a rack; a screw extrusion device; a T-shaped material port; a squeezing assembly, where the squeezing assembly includes a first roller wheel, a second roller wheel and a third roller wheel, the first roller wheel and the second roller wheel are fixedly mounted directly below the T-shaped material port side by side, and the third roller wheel is fixedly mounted next to the second roller wheel side by side; and an electromagnetic field generator fixedly connected to the T-shaped material port and mounted around the T-shaped material port in a circle by means of bolts, where the screw extrusion device is fixedly mounted at the top of the rack, and the T-shaped material port is fixedly mounted on one end of the screw extrusion device.

Preferably, the LCP film production apparatus further includes: a feed assembly, where the feed assembly includes a feed hopper, stirring rollers are rotatably mounted on two sides of the inside of the feed hopper by means of shaft sleeves, there are two stirring rollers, and stirring blades are fixedly connected to the outer wall surfaces of the stirring rollers; where the feed assembly is fixedly mounted at the top of the screw extrusion device.

Preferably, the screw extrusion device includes an extrusion barrel; an extrusion screw is rotatably mounted inside the extrusion barrel by means of a shaft sleeve; an electric heating ring is fixedly mounted on the outer wall surface of the extrusion barrel; an outer sheath is fixedly mounted outside the electric heating ring; an extrusion port is fixedly connected to one end of the extrusion barrel.

Preferably, the LCP film production apparatus further includes: a drive assembly, where the drive assembly includes a drive box, a driving rotating shaft is rotatably mounted on the inner bottom end of the drive box by means of a shaft sleeve, a drive gear is fixedly mounted outside the driving rotating shaft, driven rotating shafts are rotatably mounted on two sides of the inner upper end of the drive box by means of shaft sleeves, and driven gears are fixedly mounted outside the two driven rotating shafts; where one end of the driving rotating shaft penetrates through the drive box and is fixedly connected to one end of the extrusion screw, and one end of each of the two driven rotating shafts penetrates through the drive box and is fixedly connected to one end of each of the stirring rollers; and where the drive assembly is fixedly mounted on one side of the top of the rack.

Preferably, the LCP film production apparatus further includes: a drive motor, where a power output end of the drive motor is fixedly connected to the driving rotating shaft; where the drive motor is fixedly mounted on one end of the rack by means of a motor support.

Preferably, the electromagnetic field generator includes a microwave generator, an electric field generator, or the like.

Preferably, the drive gear is engaged with the two driven gears.

Preferably, the stirring blades on the outer walls of the two stirring rollers are distributed in a staggered manner.

Preferably, the contact surfaces of the first roller wheel and the second roller wheel are on the same vertical axis as the material port of the T-shaped material port.

According to another aspect of the present application, also provided is a use method of an LCP film production apparatus, including: connecting the LCP film production apparatus to an external power supply system so as to enable the apparatus to continuously obtain electric energy, and starting the apparatus to operate; pouring dry raw materials into a feed hopper, making a drive motor to work to drive a driving rotating shaft to rotate, driving a drive gear to rotate by means of the rotation of the driving rotating shaft, and driving two stirring rollers to rotate by means of two driven gears, so as to drive stirring blades to stir and mix the raw materials; making the raw materials enter an extrusion barrel after coming down from the feed hopper, heating the raw materials in the extrusion barrel by an electric heating ring, then melting and conveying the materials under the cooperation of rotation of an extrusion screw, and controlling the temperature of the electric heating ring so that the base material has a suitable fluidity; then, making the molten raw materials flow into a T-shaped material port from an extrusion port, and then flow into a squeezing assembly through the T-shaped material port equipped with an electromagnetic field generator; and making the molten raw materials first flow between a first roller wheel and a second roller wheel, squeezing and transferring the raw materials under the combined action of the first roller wheel and the second roller wheel to produce coil products, and finally outputting the coil products from the third roller wheel.

According to some embodiments, in the present invention, a field generated by the electromagnetic field generator can disrupt the ordered arrangement of LCP molecules, thereby alleviating or even eliminating the anisotropic problem of transverse and longitudinal tensile strength thereof. In the case that no electromagnetic field exists, the elastic modulus (load: 10-20 N) is 1750-1950 N/mm2 and the maximum load is 50-60 N in a TD direction, and the elastic modulus (load: 10-20 N) is 10500-13500 N/mm2 and the maximum load is 350-450 N in an MD direction. In the case that an electromagnetic field is added, the elastic modulus (load: 10-20 N) is 3100-3300 N/mm2 and the maximum load is 175-200 N in the TD direction, and the elastic modulus (load: 10-20 N) is 3100-3300 N/mm2 and the maximum load is 175-200 N in the MD direction. By means of fixing with bolts, the electromagnetic field generator is easy and convenient to operate during cleaning, and is thus better cleaned.

According to some embodiments, in the present invention, by means of the feed assembly mounted, the drive motor can work to drive the driving rotating shaft to rotate, the rotation of the driving rotating shaft also drives a drive gear to rotate, and two stirring rollers are driven to rotate by means of two driven gears, so that stirring blades can be driven to stir and mix the raw materials, thereby avoiding the agglomeration of the raw materials; in addition, the mixing uniformity of the raw materials can also be improved. Moreover, because the two groups of stirring blades are distributed in a staggered manner, the stirring uniformity of the raw materials can be further improved, and thus the melting efficiency of the raw materials can be improved.

Figure 1:
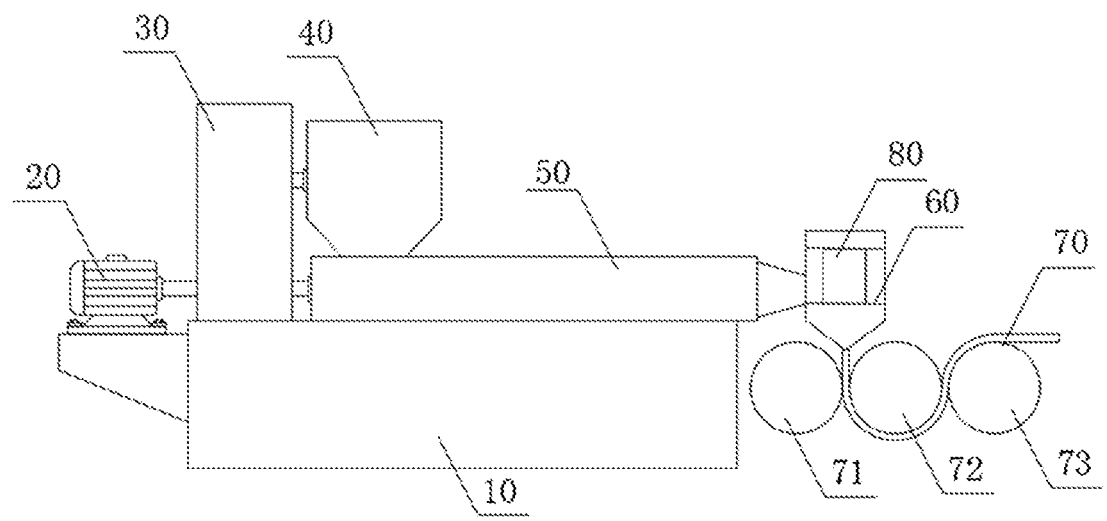
FIG. 1 is a schematic structural diagram of the entire apparatus of the present invention.

In the drawings: 10—rack; 20—drive motor; 30—drive assembly; 31—drive box; 32—driving rotating shaft; 33—driven rotating shaft; 34—drive gear; 35—driven gear; 40—feed assembly; 41—feed hopper; 42—stirring roller; 43—stirring blade; 50—screw extrusion device; 51—extrusion barrel; 52—extrusion screw; 53—electric heating ring; 54—outer sheath; 55—extrusion port; 60—T-shaped material port; 70—squeezing assembly; 71—first roller wheel; 72—second roller wheel; 73—third roller wheel; 80—electromagnetic field generator.

DETAILED DESCRIPTION

The technical solutions in embodiments of the present invention are clearly and fully described below with reference to the accompanying drawings in the embodiments of the present invention. Apparently, the described embodiments are merely some of the embodiments of the present invention, but not all the embodiments. Based on the embodiments of the present invention, all other embodiments obtained by a person of ordinary skill in the art without involving an inventive effort shall fall within the scope of protection of the present invention.

Embodiment 1

Figure 2:
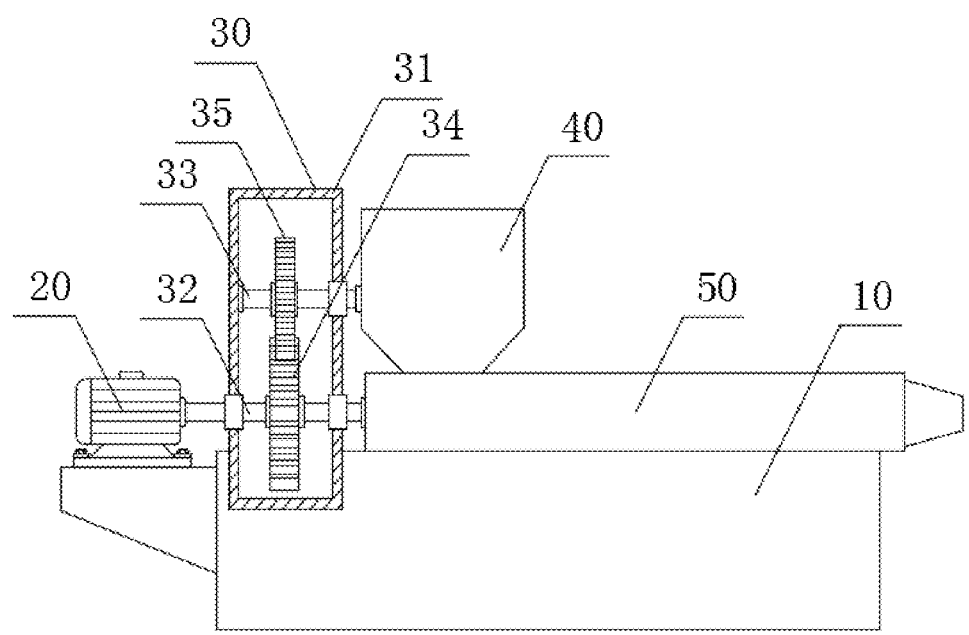
FIG. 2 is a schematic structural diagram of the interior of a drive assembly of the present invention.
Figure 3:
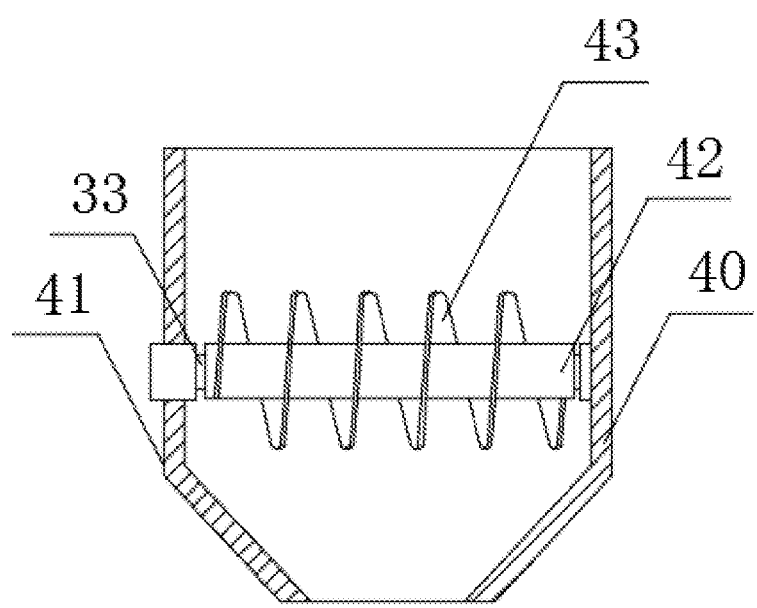
FIG. 3 is a schematic structural diagram of a feed assembly of the present invention.
Figure 4:
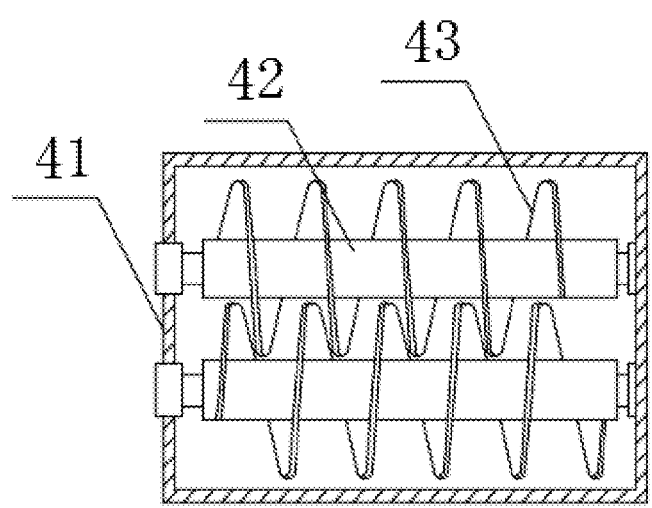
FIG. 4 is a top view of the feed assembly of the present invention.
Figure 5:
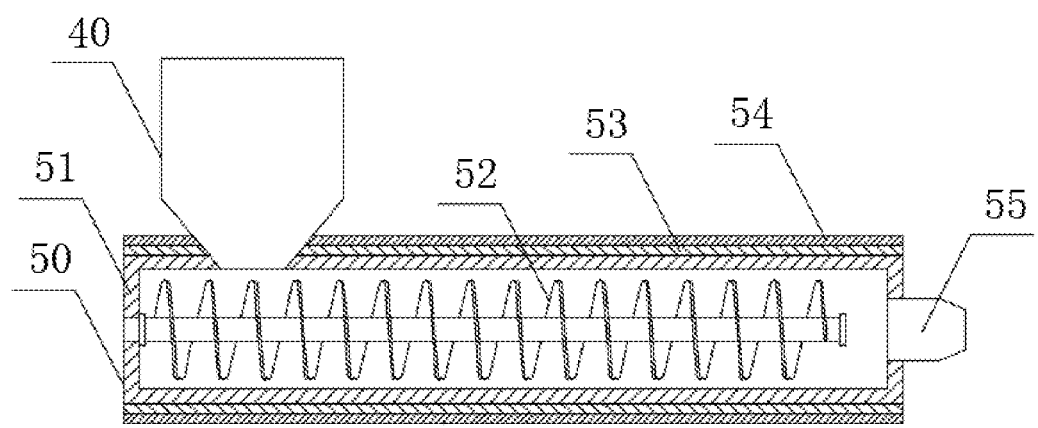
FIG. 5 is a schematic structural diagram of a screw extrusion device of the present invention.
Figure 6:
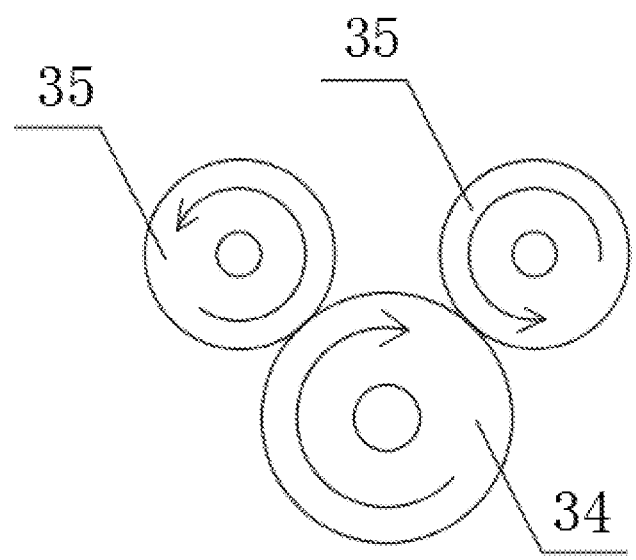
FIG. 6 is a schematic structural diagram of gear transmission of the present invention.

Referring to FIGS. 1-6, the present invention provides the following technical solution: an LCP film production apparatus, including a rack 10, a screw extrusion device 50, a T-shaped material port 60, a squeezing assembly 70, and an electromagnetic field generator 80.

The squeezing assembly 70 includes a first roller wheel 71, a second roller wheel 72 and a third roller wheel 73; the first roller wheel 71 and the second roller wheel 72 are fixedly mounted directly below the T-shaped material port 60 side by side; the third roller wheel 73 is fixedly mounted next to the second roller wheel 72 side by side.

The electromagnetic field generator 80 is fixedly connected to the T-shaped material port 60 and mounted around the T-shaped material port 60 in a circle by means of bolts.

Further, the electromagnetic field generator 80 can generate a field, including microwaves, a chaotic and disordered electric field, and the like.

The microwave generator includes: a Wepex variable frequency microwave power supply, and the like.

The electric field generator includes: a BM201 plant electric field generator, and the like.

The microwaves drive LCP polar molecules to vibrate, and can disrupt the orderly arrangement of molecules.

The chaotic and disordered electric field will disorder the liquid crystal structure in an LCP molecular chain.

The screw extrusion device 50 is fixedly mounted at the top of the rack 10, and the T-shaped material port 60 is fixedly mounted on one end of the screw extrusion device 50.

The apparatus further includes a feed assembly 40.

The feed assembly 40 includes a feed hopper 41; stirring rollers 42 are rotatably mounted on two sides of the inside of the feed hopper 41 by means of shaft sleeves; there are two stirring rollers 42; stirring blades 43 are fixedly connected to the outer wall surfaces of the stirring rollers 42.

Further, the drive motor 20 can work to drive a driving rotating shaft 32 to rotate, the rotation of the driving rotating shaft 32 also drives a drive gear 34 to rotate, and the two stirring rollers 42 are driven to rotate by means of two driven gears 35, so that the stirring blades 43 can be driven to stir and mix raw materials, thereby avoiding the agglomeration of the raw materials; in addition, the mixing uniformity of the raw materials can also be improved.

The feed assembly 40 is fixedly mounted at the top of the screw extrusion device 50.

The screw extrusion device 50 includes an extrusion barrel 51; an extrusion screw 52 is rotatably mounted inside the extrusion barrel 51 by means of a shaft sleeve; the extrusion screw 52 is driven to rotate by the driving rotating shaft 32, and can play a spiral pushing role on the raw materials; an electric heating ring 53 is fixedly mounted on the outer wall surface of the extrusion barrel 51; the electric heating ring 53 converts electric energy into thermal energy by the joule effect of electric current, to generate heat to heat the barrel wall of the extrusion barrel 51, and thus can heat and melt the raw materials, which is an existing mature technology; an outer sheath 54 is fixedly mounted outside the electric heating ring 53; an extrusion port 55 is fixedly connected to one end of the extrusion barrel 51.

Further, the raw materials enter the extrusion barrel 51 after coming down from the feed hopper 41; at the same time, the electric heating ring 53 can heat the raw materials in the extrusion barrel 51, and then melt and convey the materials under the cooperation of rotation of the extrusion screw 52.

A layer of thermal insulation cotton is adhered to the inner wall of the outer sheath 54; this layer can effectively isolate the heat dissipation of the electric heating ring 53, and thus not only has a thermal insulation effect, but also can prevent heat from conduction to the outer sheath 54 to scald the worker.

Further, the temperature of the electric heating ring 53 is controlled in the screw extrusion device 50 so that the base material has a suitable fluidity and flows into the squeezing assembly 70 within a predetermined time.

The apparatus further includes a drive assembly 30.

The drive assembly 30 includes a drive box 31; the driving rotating shaft 32 is rotatably mounted on the inner bottom end of the drive box 31 by means of a shaft sleeve; the drive gear 34 is fixedly mounted outside the driving rotating shaft 32; the driven rotating shafts 33 are rotatably mounted on two sides of the inner upper end of the drive box 31 by means of shaft sleeves, where the driven gears 35 are fixedly mounted outside the two driven rotating shafts 33.

Further, the drive motor 20 can work to drive the driving rotating shaft 32 to rotate, the rotation of the driving rotating shaft 32 also drives the drive gear 34 to rotate, and the two driven rotating shafts 33 are driven to rotate by means of the two driven gears 35.

One end of the driving rotating shaft 32 penetrates through the drive box 31 and is fixedly connected to one end of the extrusion screw 52, where one end of each of the two driven rotating shafts 33 penetrates through the drive box 31 and is fixedly connected to one end of each of the stirring rollers 42.

The drive assembly 30 is fixedly mounted on one side of the top of the rack 10.

The apparatus further includes a drive assembly 20.

A power output end of the drive motor 20 is fixedly connected to the driving rotating shaft 32.

Further, the drive motor 20 can work to drive the driving rotating shaft 32 to rotate.

The drive motor 20 is fixedly mounted on one end of the rack 10 by means of a motor support.

The electromagnetic field generator 80 includes a microwave generator, an electric field generator, or the like.

The drive gear 34 is engaged with the two driven gears 35.

Further, the rotation of the drive gear 34 can drive the driven gears 35 to rotate. Only one motor can drive a plurality of components to move, thus the cost is greatly reduced, and the loss of electric energy can also be reduced.

The stirring blades 43 on the outer walls of the two stirring rollers 42 are distributed in a staggered manner.

Further, because two groups of stirring blades 43 are distributed in a staggered manner, the stirring uniformity of the raw materials can be further improved, and thus the melting efficiency of the raw materials can be improved.

The contact surfaces of the first roller wheel 71 and the second roller wheel 72 are on the same vertical axis as the material port of the T-shaped material port 60.

Further, it is ensured that the raw materials flowing out of the T-shaped material port 60 can accurately flow into a space between the first roller wheel 71 and the second roller wheel 72.

In view of the above embodiments, the field generated by the electromagnetic field generator can disrupt the ordered arrangement of LCP molecules by means of, thereby alleviating or even eliminating the anisotropic problem of transverse and longitudinal tensile strength thereof. In the case that no electromagnetic field exists, the elastic modulus (load: 10-20 N) is 1750-1950 N/mm2 and the maximum load is 50-60 N in a TD direction, and the elastic modulus (load: 10-20 N) is 10500-13500 N/mm2 and the maximum load is 350-450 N in an MD direction. In the case that an electromagnetic field is added, the elastic modulus (load: 10-20 N) is 3100-3300 N/mm2 and the maximum load is 175-200 N in the TD direction, and the elastic modulus (load: 10-20 N) is 3100-3300 N/mm2 and the maximum load is 175-200 N in the MD direction.

Embodiment 2

Referring to FIGS. 1-6, the present invention provides the following technical solution: a use method of an LCP production apparatus, including the following steps:

S1: connecting the LCP film production apparatus to an external power supply system so as to enable the apparatus to continuously obtain electric energy, and starting the apparatus to operate;

S2: pouring dry raw materials into a feed hopper 41, making a drive motor 20 work to drive a driving rotating shaft 32 to rotate, driving a drive gear 34 to rotate by means of the rotation of the driving rotating shaft 32, and driving two stirring rollers 42 to rotate by means of two driven gears 35, so as to drive stirring blades 43 to stir and mix the raw materials;

S3: making the raw materials enter an extrusion barrel 51 after coming down from the feed hopper 41, heating the raw materials in the extrusion barrel 51 by an electric heating ring 53, then melting and conveying the materials under the cooperation of rotation of an extrusion screw 52, and controlling the temperature of the electric heating ring 53 so that the base material has a suitable fluidity;

S4: making the molten raw materials flow into a T-shaped material port 60 from an extrusion port 55, and then flow into a squeezing assembly 70 through the T-shaped material port 60 equipped with an electromagnetic field generator 80; and S5: making the molten raw materials first flow between a first roller wheel 71 and a second roller wheel 72, squeezing and transferring the raw materials under the combined action of the first roller wheel 71 and the second roller wheel 72 to produce coil products, and finally outputting the coil products from the third roller wheel 73.

In view of the above embodiments, the LCP film produced by the apparatus can ensure the tensile fracture resistance of the LCP film.

In the implementations provided by the present invention, it should be understood that the disclosed apparatus may be implemented in other ways. The displayed or discussed mutual welding or threaded connection or winding connection may be assisted by devices, for example, the welding is implemented using a welding torch, and the threaded connection is implemented using a wrench. The components of the apparatus are made of various materials, such as aluminum alloy, steel, copper and other metal materials, and are molded by casting, mechanical stamping or the like.

It should be noted that relational terms herein, such as first and second, are used only for differentiating an entity or operation from another entity or operation, which, however do not necessarily require or imply that there is any actual relationship or sequence between those entities or operations. Moreover, the terms "include", "comprise" or any other variants thereof are intended to cover non-exclusive inclusion, so that a process, method, article or device that includes a series of elements includes not only those elements, but also other elements that are not explicitly listed or elements inherent to the process, method, article, or device.

The above are merely implementations of the present invention, and thus should not be construed to limit the patent scope of the present invention. Any equivalent structure or equivalent process flow transformation made according to the specification and the accompanying drawings of the present invention, or any direct or indirect application of the present invention in other related technical fields shall all be included in the scope of patent protection of the present invention.

The invention claimed is:

1. An LCP film production apparatus, comprising:
   a rack;
   a screw extrusion device;
   a T-shaped material port;
   a squeezing assembly, wherein the squeezing assembly comprises a first roller wheel, a second roller wheel, and a third roller wheel, the first roller wheel and the second roller wheel are fixedly mounted directly below the T-shaped material port side by side, and the third roller wheel is fixedly mounted next to the second roller wheel side by side; and
   an electromagnetic field generator, fixedly connected to the T-shaped material port and mounted around the T-shaped material port in a circle by means of bolts;
   wherein the screw extrusion device is fixedly mounted at a top of the rack, and the T-shaped material port is fixedly mounted on one end of the screw extrusion device, and
   wherein contact surfaces of the first roller wheel and the second roller wheel are on a same vertical axis as the material port of the T-shaped material port.

2. The LCP film production apparatus according to claim 1, further comprising:
   a feed assembly, wherein the feed assembly comprises a feed hopper, stirring rollers are rotatably mounted on two sides of an inside of the feed hopper by means of shaft sleeves, there are two stirring rollers, and stirring blades are fixedly connected to an outer wall surfaces of the stirring rollers;
   wherein the feed assembly is fixedly mounted at a top of the screw extrusion device.

3. The LCP film production apparatus according to claim 2, wherein the stirring blades on the outer walls of the two stirring rollers are distributed in a staggered manner.

4. The LCP film production apparatus according to claim 1, wherein the screw extrusion device comprises an extrusion barrel; an extrusion screw is rotatably mounted inside the extrusion barrel by means of a shaft sleeve; an electric heating ring is fixedly mounted on an outer wall surface of the extrusion barrel; an outer sheath is fixedly mounted outside the electric heating ring; an extrusion port is fixedly connected to one end of the extrusion barrel.

5. The LCP film production apparatus according to claim 1, further comprising:
   a drive assembly, wherein the drive assembly comprises a drive box, a driving rotating shaft is rotatably mounted on an inner bottom end of the drive box by means of a shaft sleeve, a drive gear is fixedly mounted outside the driving rotating shaft, driven rotating shafts are rotatably mounted on two sides of an inner upper end of the drive box by means of shaft sleeves, and driven gears are fixedly mounted outside the two driven rotating shafts;
   wherein one end of the driving rotating shaft penetrates through the drive box and is fixedly connected to one end of the extrusion screw, and one end of each of the two driven rotating shafts penetrates through the drive box and is fixedly connected to one end of each of the stirring rollers; and
   wherein the drive assembly is fixedly mounted on one side of the top of the rack.

6. The LCP film production apparatus according to claim 5, wherein the drive gear is engaged with the two driven gears.

7. The LCP film production apparatus according to claim 1, further comprising:
   a drive motor, wherein a power output end of the drive motor is fixedly connected to the driving rotating shaft;
   wherein the drive motor is fixedly mounted on one end of the rack by means of a motor support.

8. The LCP film production apparatus according to claim 1, wherein the electromagnetic field generator comprises a microwave generator or an electric field generator.

* * * * *